UNITED STATES PATENT OFFICE.

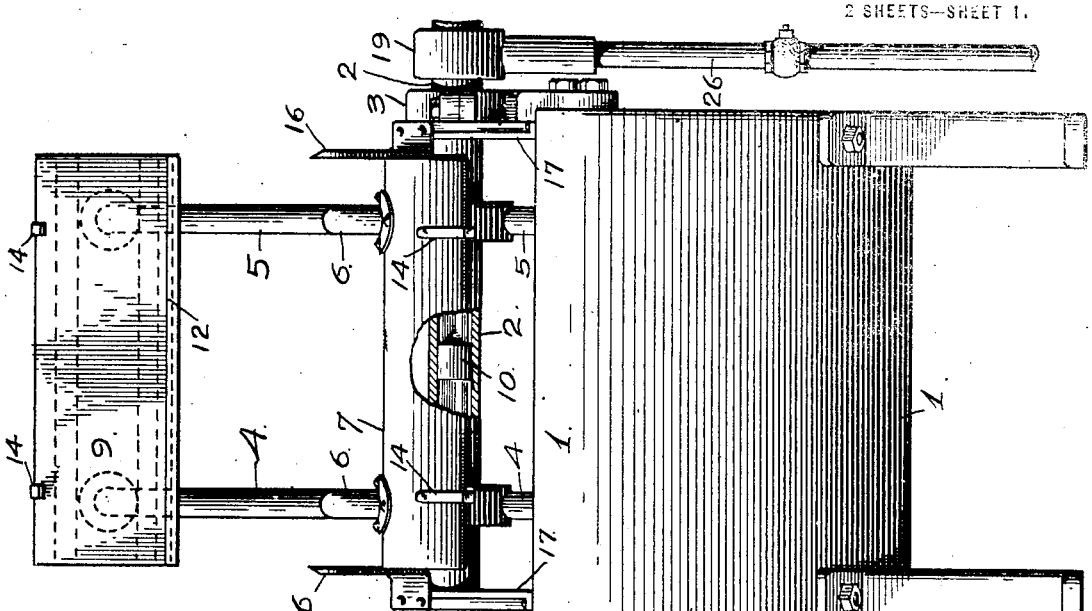

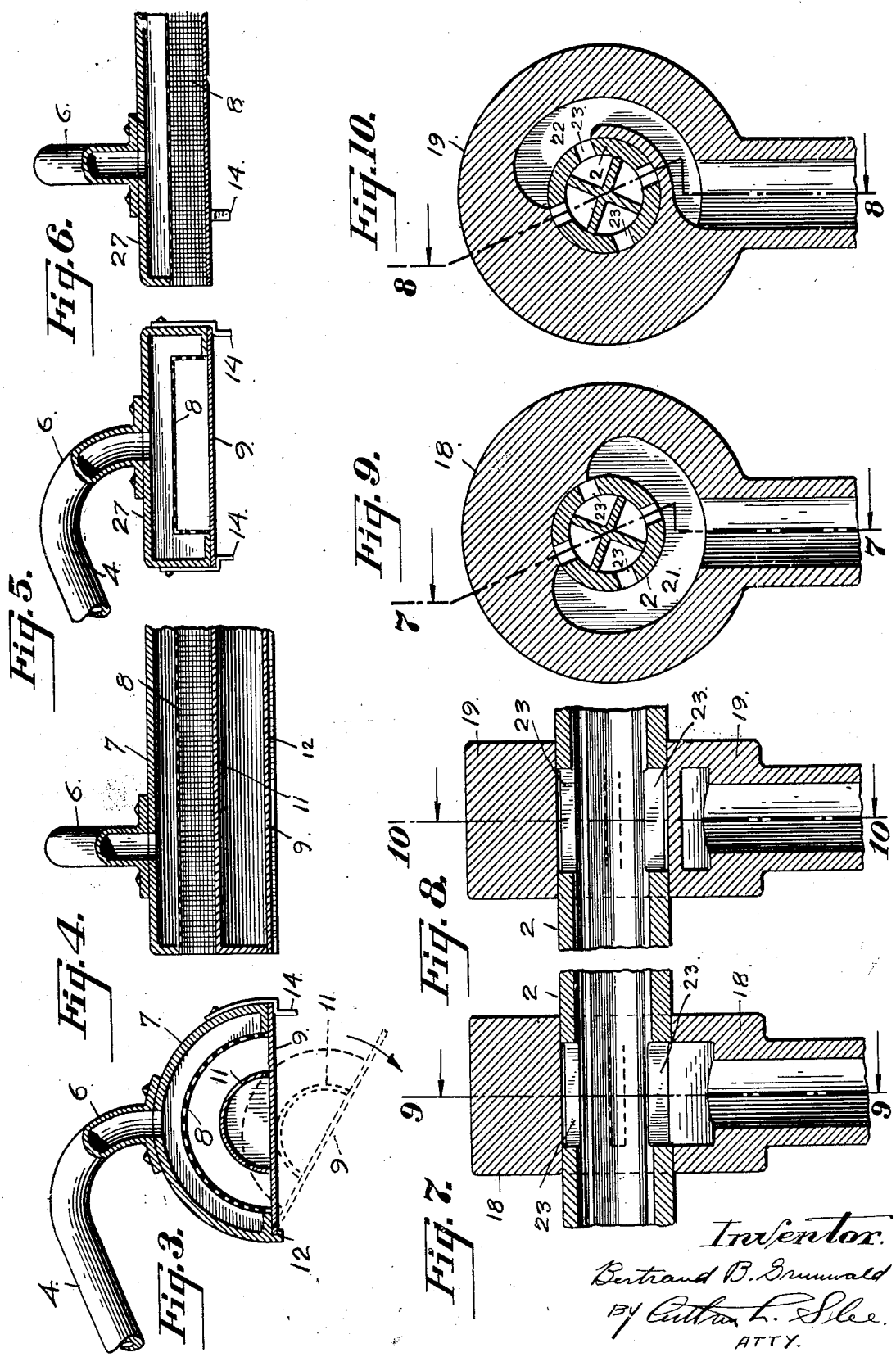

BERTRAND B. GRUNWALD, OF ALAMEDA, CALIFORNIA, ASSIGNOR, BY MESNE ASSIGNMENTS, TO A. J. MERLE, OF ALAMEDA, CALIFORNIA.

APPARATUS FOR MOLDING PIPE AND BOILER-COVERINGS.

1,286,591.  Specification of Letters Patent.  Patented Dec. 3, 1918.

Application filed August 5, 1918. Serial No. 249,029.

*To all whom it may concern:*

Be it known that I, BERTRAND B. GRUNWALD, a subject of the Emperor of Austria, residing in Alameda, in the county of Alameda and State of California, have invented a new and useful Improvement in an Apparatus for Molding Pipe and Boiler-Coverings, of which the following is a specification.

My invention relates to improvements in machines for molding insulating pipe and boiler coverings wherein a series of drying frames operate in conjunction with a series of molds for forming said coverings; and the objects of my invention are—

First, to provide an improved machine for molding insulating pipe and boiler coverings;

Second, to provide an improved machine of the class described adapted to mold pipe and boiler coverings directly onto drying frames to eliminate handling of the coverings after formation and while still in a plastic condition;

Third, to provide an improved device of the character described having means for trimming the formed coverings before being removed from the molds thereby immediately recovering a portion of the pulp or mixture whereby waste may be eliminated;

Fourth, to provide an improved machine as set forth wherein the formed coverings are partially drained and dried by the suction and gravity after being removed from the liquid mixture from which the coverings are being formed; and Fifth, to provide an improved machine for molding insulating pipe and boiler coverings wherein a complete covering is formed directly onto a drying frame to facilitate handling of the plastic covering; and Sixth, to provide a machine for producing an insulating pipe and boiler covering having a maximum lightness and porosity.

I accomplish these several objects by means of the device disclosed in the drawings forming a part of the present specification wherein like characters of references are used to designate similar parts throughout the said specification and drawings, and in which—

Figure 1 is a front elevation of my improved device partly broken and partly in section;

Fig. 2 is a partly broken end elevation of Fig. 1;

Fig. 3 is an enlarged transverse sectional view of one form of mold with a drying frame attached thereto;

Fig. 4 is a broken longitudinal sectional view of Fig. 3;

Fig. 5 is a transverse sectional view of a different form of mold for forming flat coverings;

Fig. 6 is a broken longitudinal sectional view of Fig. 5;

Figs. 7 and 8 are sectional views on lines 7—7 and 8—8 of Figs. 9 and 10 respectively of the suction and pressure controlling mechanism; and Figs. 9 and 10 are sectional views taken on lines 9—9 and 10—10 of Figs. 7 and 8 respectively, in the directions indicated.

Referring to the drawings the numeral 1 is used to designate a preferably semi-cylindrical container arranged to contain a pulp or mixture from which the coverings are to be formed. A hollow channeled shaft 2 is rotatably mounted within suitable bearings 3 upon the container 1.

A pair of tubular arms 4 and 5 radiate from each channel within the shaft 2 and are provided with arcuate extensions 6 and to the ends of each pair of said extensions 6 is secured an arcuate hollow mold 7 having a semi-circular screen 8 forming one side thereof. A drying frame 9 is detachably mounted upon each mold 7 and is provided with an arcuate or semi-circular core 11 which core operates with the semi-circular screen 8 to form a semi-circular channel or passage open at both ends thereof the purpose of which will hereinafter be more fully set forth.

Each drying frame 9 is detachably mounted upon each of the series of molds 7 by having one edge of the mold 7 while the opposite edge of said frame is detachably secured in position by means of suitable spring latches 14.

A pair of knives 16 or any other suitable trimming or cutting means are mounted upon suitable brackets 17 secured to the top of the container 1 as disclosed in Figs. 1 and 2 of the drawings. The knives 16 are set to move past the ends of the molds 7 during their rotation around the hollow shaft 2 and thereby trim the ends of the formed coverings projecting beyond the ends of said molds 7 thereby producing a completed mold within the machine. As the ends are cut or trimmed off the plastic material drops back into the container 1 where it is again agitated to facilitate mixture or combination with the contents of said container 1 by the rotation of the series of molds 7.

Suction and pressure regulators 18 and 19 respectively are rotatably mounted upon opposite ends of the shaft 2 and beyond the bearings 3 thereof. The regulator 18 is provided with an internal channel 21 arranged to intercept approximately three quarters of the periphery of that portion of the shaft 2 inclosed therein while the regulator 19 is provided with a similar channel 22 arranged to intercept the remaining portion or one quarter of that portion of the shaft 2 inclosed therein.

The portions of the shaft 2 inclosed within the regulators 18 and 19 are provided with apertures 23 arranged directly opposite each channel of the said shaft 2. Suction and pressure pipes 24 and 26 connect with the regulators 18 and 19 respectively the purpose of which will hereinafter be more fully described.

The hollow shaft 2 is provided in the approximate center thereof with a plug or partition 10 which divides said shaft 2 into two compartments with which the tubular arms 4 connect, the purpose of which will hereinafter be described.

In operation the container 1 is filled with a mixture or solution comprising one hundred parts of water, eighty-five parts of magnesia or other suitable insulating material and fifteen parts of fibrous asbestos or other suitable binder.

The drying frames 9 having been detachably secured in position on the molds 7 to provide a space the hollow shaft 2 is slowly rotated in the direction indicated by the arrow in Fig. 1 of the drawings.

As each mold 7 and drying frame 9 attached thereto is immersed within the mixture of the container 1 the tubular arms 4 of that mold register with the channel 21 of the regulator 18 thereby connecting a suction to the interior of the mold 7 which operates to draw the mixture by said suction into the mold thereby forming a layer of insulating material and binder onto the screen 8 until the entire space between said screen 8 and the core 11 of the drying frame 9 is filled.

As each mold 7 emerges from the mixture it will be noted that the arcuate extensions 6 are positioned on the bottom of the molds 7 so that gravity and the suction through the pipe or tubular arms 4 operate to drain moisture from the formed covering thereby facilitating the drying of the formed covering and rendering the same slightly porous to produce a light covering as excessive weight is objectionable in this form of covering.

As the mold attains its highest position the aperture 23 in the end of the shaft 2 within the regulator 18 is covered and the aperture 23 for that mold or channel connected thereto and on the opposite end of the shaft 2 within the regulator 19 registers with the channel 22 in said regulator 19 thereby producing an air pressure within the mold 7. This pressure has a further tendency to remove any remaining moisture and thereby render a greater porosity to the formed covering. The air pressure also tends to loosen the formed covering from the interstices of the screen 8 to facilitate removal of the said covering from the mold.

As each mold 7 passes between the trimmers or knives 16 any material projecting beyond the ends of the mold 7 and drying frame 9 attached thereto will be removed and drop back into the container 1 to be again mixed with the mixture or solution within the container 1 by agitation of said solution caused by the rotation of the molds 7 therethrough.

After passing between the knives 16 the latches 14 are operated to release the drying frames 9 and said frames are then removed from the molds 7 in the direction indicated by the dotted lines in Fig. 3 of the drawings.

In Figs. 5 and 6, I have illustrated a different form of flat rectangular molds 27 which are similar to the semi-circular molds except for the shape. In this flat form of mold 27 the drying frames 9 are without cores and the flat covering, such as is used for boilers and other large surfaces, is formed directly upon a flat drying frame 9. This frame is provided with two latches 14 in order that the drying frame 9 with its flat rectangular covering formed therein may be dropped directly away from the screen 8 therein.

It is obvious from the foregoing that I have provided an improved machine for molding pipe and boiler coverings wherein the covering is formed directly upon the drying frame and automatically trimmed thereby delivering a complete covering.

Having thus described my invention what I claim as new and desire to secure by Letters Patent is—

1. A molding machine for pipe and boiler coverings comprising a series of rotating screen molds arranged to be immersed within and removed from a mixture from which the coverings are to be formed, during rotation; drying frames detachably mounted upon the molds to form chambers to shape said coverings; means for producing a suction within the molds to draw the mixture into said chambers and to drain moisture from the bottom of the molds after being removed from said mixture; means for producing an air pressure in the molds to dry the formed coverings; and means for trimming the ends of the formed coverings projecting beyond the ends of the chambers.

2. A molding machine for pipe and boiler coverings comprising a container to contain a mixture from which the coverings are to be formed; a series of screen molds rotatably mounted upon the container and arranged, during their rotation, to be immersed and removed from the mixture within the container; suitable drying frames detachably mounted upon the molds to form a chamber to shape coverings, said chambers being open at the ends thereof; means for producing a suction within the molds and chambers to draw the mixture through the screen molds and thereby produce a covering and for draining said molds from the bottom thereof during a portion of their rotation after being removed from the mixture; means for producing an air pressure within the molds to dry the formed coverings; and means for trimming the ends of the molds projecting from the chambers.

3. A molding machine for pipe and boiler coverings comprising a container to contain a mixture from which said coverings are to be formed; a hollow channeled shaft rotatably mounted upon the container; a pair of hollow arms radiating from each channel in the shaft; a hollow mold having a screened opening and mounted upon each pair of arms; a drying frame detachably mounted upon each mold to form, in conjunction with the screen thereon, a chamber for the formation of the boiler and pipe coverings; means for producing a suction on each mold for drawing the mixture from the container into the mold to form and drain a covering; means for producing an air pressure within the mold to drain and partially dry the formed covering; and means for trimming the ends of the formed coverings.

4. A molding machine for pipe and boiler coverings comprising a container to contain a mixture from which said coverings are to be formed; a hollow channeled shaft rotatably mounted upon the container; a pair of hollow arms radiating from each channel in the shaft; a hollow mold having a screened opening and mounted upon each pair of arms; a drying frame detachably mounted upon each mold to form, in conjunction with the screen thereon, a chamber for the formation of the boiler and pipe coverings; means for producing a suction on each mold for drawing the mixture from the container into the mold to form and drain a covering; means for producing an air pressure within the mold to drain and partially dry the formed covering; and suitable knives mounted upon the container and adjacent the path of the molds to trim the ends of the formed coverings when said molds pass between said knives.

In witness whereof I hereunto set my signature.

BERTRAND B. GRUNWALD.